Patented Nov. 7, 1933

1,934,043

UNITED STATES PATENT OFFICE 1,934,043

PROCESS OF IMPROVEMENT OF LUBRICATING OILS

Garland H. B. Davis, Baton Rouge, La., assignor to Standard Oil Development Company, a corporation of Delaware No Drawing. Application May 17, 1929
Serial No. 364,003

5 Claims. (Cl. 196—44)

The present invention relates to the art of producing improved lubricants from hydrocarbon oils and will be fully understood from the following description.

The improvement of lubricating oils by the action of aluminum chloride is well known but the process has many objections and undesirable features, one of which is the large treating loss due to the formation of light low boiling oils. I have discovered methods by which this loss is greatly reduced and at the same time lubricating oils of much improved character are produced.

In the operation of my process, I may treat any suitable heavy oil, such as Mid-Continent distillate, cylinder oil or Coastal oils and such oils may be rendered equal or even superior to Pennsylvania oils. As a first step in my process, I add aluminum chloride to an oil or oleaginous substance which is largely of a paraffinic nature to form an activated product with which I treat the heavy oil to be improved. For this purpose the less valuable cuts may be used, such as gas oil or light spindle oil, but I prefer to use crude or refined petrolatum. The quantity of aluminum chloride may be varied considerably but is in general within the limits of 50 to 250 pounds per barrel of the oil or petrolatum, as an average, 100 pounds is most satisfactory. This mass is heated to about 200° F. for a short time. The temperature may be varied, but in general the limits are from about 150° to 350° F. During this time there may be a slight formation of low boiling distillate which is removed from the treating vessel and condensed. The time of treatment generally need not be longer than about half an hour, and is usually completed in a much shorter time. The mass is preferably agitated throughout this period and is then mixed with a larger quantity of the heavy oil which it is desired to treat. The mixture is kept at a temperature of say 150° to 350° F. for two hours or more, collecting whatever slight distillate is formed. The mixture is then removed and if excess petrolatum is used to form the activated material, the excess may be removed by cold settling, either alone or after dilution with naphtha or other suitable organic material, such as isopropyl, secondary butyl, or amyl alcohol or the like. The oil is withdrawn from the settled semi-solid material and the naphtha or other solvent may be removed by distillation and collected for reuse. The oil may be further reduced or distilled under vacuum or with steam to produce the cuts of the desired viscosity. The color of the oil is generally improved, together with its lubricating properties and in addition the slope of the viscosity-temperature curve is reduced.

The quantity of activated petrolatum or other oil, added to the oil to be treated, depends on the character of the oil and the degree of improvement desired. It is generally preferable to add from about 10 to 25% by volume of the oil to be treated, but it may be more, if desired.

As an example of the operation of the process, an oil of the following characteristics is treated:

| | |
|---|---|
| Gravity | 23.1° A. P. I. |
| Saybolt viscosity at 210° F | 74 sec. |
| Saybolt viscosity at 100° F | 844 sec. |
| Flash | 410° F. |
| Pour | 27° F. |
| Conradson carbon | 1.1% |

To this oil about 15% of activated petrolatum is added, which is prepared by agitating crude petrolatum with 150 lbs. of $AlCl_3$ per barrel for ½ hour at 200° F. The mixture is then agitated for three hours at 200° F., the aluminous sludge separated, and the oil steamed for a flash of 410° F. The oil on examination showed the following characteristics:

| | |
|---|---|
| Gravity | 25.30 A. P. I. |
| Saybolt viscosity at 210° F | 73 sec. |
| Saybolt viscosity at 100° F | 728 sec. |
| Flash | 410° F. |
| Pour | 35° F. |
| Conradson carbon | 0.42% |

A yield of 92% of the heavy oil treated is recovered. In a similar experiment, the original oil is treated with twenty pounds of $AlCl_3$ per barrel for three hours at 200° F. and it is found that the yield is about 10% less than obtained in the previous experiment and the oil is no better.

It will be observed that the viscosity index of the oil has been markedly increased, viz., the viscosity at 100° F. is practically constant at 73 seconds Saybolt while the viscosity at 210° F. has been decreased from 844 to 728 seconds Saybolt. The "viscosity index" is a function of the viscosities at 100 and 210° F. and is used in this sense as defined by E. W. Dean and G. H. B. Davis in an article in "Chemical and Metallurgical Engineering" vol. 36, 1929, page 618.

My invention may be carried out in any preferred type of apparatus which need not be described since it is preferably similar to that already well known in the art. My process may also be carried out with zinc chloride, or other catalytic metallic halide, in place of aluminum chloride.

This invention is not to be limited by any theory of the mechanism of the process nor the chemistry involved nor by any example given merely for purposes of illustration, but only by the following claims in which I wish to claim all novelty inherent in the invention.

I claim:

1. Process for improvement of lubricating oil, comprising the steps of preparing an activated hydrocarbon by treating petrolatum with aluminum chloride, admixing such activated hydrocarbon with the lubricating oil and maintaining the mixture at an elevated temperature for a prolonged period, cooling and removing the excess of petrolatum and the aluminous sludge.

2. Process according to claim 1, in which the activated mixture is added in amounts from about 10 to 25% of the oil to be treated.

3. Process according to claim 1, in which the activated mixture is prepared by treatment of petrolatum with from about 50 to 250 pounds of aluminum chloride per barrel.

4. Process for obtaining increased yields of improved lubricating oil from lubricating distillates, which comprises warming said distillates for a prolonged period with a separately prepared activated sludge of anhydrous aluminum chloride and petrolatum and subsequently separating the excess sludge and petrolatum.

5. A process for the improvement of lubricating oils comprising admixing oil with petrolatum which has been separately activated by treatment with a catalytic metallic halide and maintaining the mixture at a temperature within the approximate range of 150 to 350° F. for a prolonged period.

GARLAND H. B. DAVIS.